(12) United States Patent
Kwon et al.

(10) Patent No.: US 7,952,768 B2
(45) Date of Patent: May 31, 2011

(54) METHOD OF COLOR INTERPOLATION OF IMAGE DETECTED BY COLOR FILTER

(75) Inventors: Tae Hyeon Kwon, Seoul (KR); Kyoung Joong Min, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 921 days.

(21) Appl. No.: 11/859,625

(22) Filed: Sep. 21, 2007

(65) Prior Publication Data

US 2008/0075393 A1   Mar. 27, 2008

(30) Foreign Application Priority Data

Sep. 22, 2006  (KR) .................. 10-2006-0092341

(51) Int. Cl.
*G06K 9/00* (2006.01)
*H04N 3/14* (2006.01)
*H04N 5/335* (2011.01)
*H04N 9/04* (2006.01)
*H04N 9/083* (2006.01)

(52) U.S. Cl. ......... 358/167; 382/162; 348/272; 348/273

(58) Field of Classification Search .................. None
See application file for complete search history.

(56) References Cited

U.S. PATENT DOCUMENTS

| | | | | |
|---|---|---|---|---|
| 5,373,322 A * | 12/1994 | Laroche et al. | ............... | 348/273 |
| 6,229,578 B1 * | 5/2001 | Acharya et al. | ............... | 348/607 |
| 6,563,537 B1 * | 5/2003 | Kawamura et al. | ............ | 348/252 |
| 6,754,279 B2 * | 6/2004 | Zhou et al. | ............... | 375/240.28 |
| 6,970,597 B1 * | 11/2005 | Olding et al. | ................. | 382/167 |
| 7,643,676 B2 * | 1/2010 | Malvar | .......................... | 382/162 |
| 7,664,316 B2 * | 2/2010 | Aoki | ............................. | 382/162 |
| 2005/0117040 A1 * | 6/2005 | Matsutani | ..................... | 348/272 |
| 2005/0190993 A1 * | 9/2005 | Chang | .......................... | 382/300 |
| 2006/0146150 A1 * | 7/2006 | Kang | ............................. | 348/272 |
| 2006/0170798 A1 * | 8/2006 | Lee et al. | ..................... | 348/272 |
| 2007/0091188 A1 * | 4/2007 | Chen et al. | .................... | 348/273 |
| 2008/0062479 A1 * | 3/2008 | Tsai et al. | ..................... | 358/518 |
| 2008/0240559 A1 * | 10/2008 | Malvar | .......................... | 382/167 |
| 2008/0298722 A1 * | 12/2008 | Lee et al. | ..................... | 382/300 |
| 2009/0066821 A1 * | 3/2009 | Achong et al. | ................ | 348/273 |

* cited by examiner

*Primary Examiner* — Samir A Ahmed
*Assistant Examiner* — Li Liu
(74) *Attorney, Agent, or Firm* — Lowe, Hauptman, Ham & Berner, LLP

(57) ABSTRACT

A color interpolation method capable of more precisely interpolating each of pixels of an image passing through a color filter of a Bayer pattern and detected by an image sensor, the method including: defining a pixel group of a matrix structure, having a pixel to be color-interpolated as a center pixel, in an image passed through a color filter of Bayer pattern and detected by an image sensor; determining whether an edge exists or not in the pixel group; interpolating a color of the center pixel using a low pass filter when an edge does not exist in the pixel group; and interpolating a color of the center pixel according to directivity of an edge when the edge exists in the pixel group. The invention suppresses noise during color interpolation and enables more precise color interpolation.

20 Claims, 12 Drawing Sheets

| P11 | P12 | P13 | P14 | P15 |
|---|---|---|---|---|
| P21 | P22 | P23 | P24 | P25 |
| P31 | P32 | P33 | P34 | P35 |
| P41 | P42 | P43 | P44 | P45 |
| P51 | P52 | P53 | P54 | P55 |

FIG. 7a

| P11 | P12 | P13 | P14 | P15 |
|---|---|---|---|---|
| P21 | P22 | P23 | P24 | P25 |
| P31 | P32 | P33 | P34 | P35 |
| P41 | P42 | P43 | P44 | P45 |
| P51 | P52 | P53 | P54 | P55 |

FIG. 7b

| G11 | R12 | G13 | R14 | G15 |
|---|---|---|---|---|
| B21 | G22 | B23 | G24 | B25 |
| G31 | R32 | G33 | R34 | G35 |
| B41 | G42 | B43 | G44 | B45 |
| G51 | R52 | G53 | R54 | G55 |

FIG. 8a

| R11 | G12 | R13 | G14 | R15 |
|---|---|---|---|---|
| G21 | B22 | G23 | B24 | G25 |
| R31 | G32 | R33 | G34 | R35 |
| G41 | B42 | G43 | B44 | G45 |
| R51 | G52 | R53 | G54 | R55 |

FIG. 8b

| P11 | P12 | P13 | P14 | P15 |
|---|---|---|---|---|
| P21 | P22 | P23 | P24 | P25 |
| P31 | P32 | P33 | P34 | P35 |
| P41 | P42 | P43 | P44 | P45 |
| P51 | P52 | P53 | P54 | P55 |

FIG. 9A

| P11 | P12 | P13 | P14 | P15 |
|---|---|---|---|---|
| P21 | P22 | P23 | P24 | P25 |
| P31 | P32 | P33 | P34 | P35 |
| P41 | P42 | P43 | P44 | P45 |
| P51 | P52 | P53 | P54 | P55 |

FIG. 9B

| P11 | P12 | P13 | P14 | P15 |
|---|---|---|---|---|
| P21 | P22 | P23 | P24 | P25 |
| P31 | P32 | P33 | P34 | P35 |
| P41 | P42 | P43 | P44 | P45 |
| P51 | P52 | P53 | P54 | P55 |

FIG. 9C

| P11 | P12 | P13 | P14 | P15 |
|---|---|---|---|---|
| P21 | P22 | P23 | P24 | P25 |
| P31 | P32 | P33 | P34 | P35 |
| P41 | P42 | P43 | P44 | P45 |
| P51 | P52 | P53 | P54 | P55 |

FIG. 10A

| P11 | P12 | P13 | P14 | P15 |
|---|---|---|---|---|
| P21 | P22 | P23 | P24 | P25 |
| P31 | P32 | P33 | P34 | P35 |
| P41 | P42 | P43 | P44 | P45 |
| P51 | P52 | P53 | P54 | P55 |

| P11 | P12 | P13 | P14 | P15 |
|-----|-----|-----|-----|-----|
| P21 | P22 | P23 | P24 | P25 |
| P31 | P32 | ~~P33~~ | P34 | P35 |
| ~~P41~~ | ~~P42~~ | ~~P43~~ | ~~P44~~ | ~~P45~~ |
| P51 | P52 | P53 | P54 | P55 |

FIG. 12A

| P11 | P12 | P13 | P14 | P15 |
|-----|-----|-----|-----|-----|
| ~~P21~~ | ~~P22~~ | ~~P23~~ | ~~P24~~ | ~~P25~~ |
| P31 | P32 | ~~P33~~ | P34 | P35 |
| P41 | P42 | P43 | P44 | P45 |
| P51 | P52 | P53 | P54 | P55 |

FIG. 12B

| P11 | P12 | P13 | P14 | P15 |
|-----|-----|-----|-----|-----|
| ~~P21~~ | ~~P22~~ | ~~P23~~ | ~~P24~~ | ~~P25~~ |
| P31 | P32 | ~~P33~~ | P34 | P35 |
| ~~P41~~ | ~~P42~~ | ~~P43~~ | ~~P44~~ | ~~P45~~ |
| P51 | P52 | P53 | P54 | P55 |

FIG. 12C

METHOD OF COLOR INTERPOLATION OF IMAGE DETECTED BY COLOR FILTER

CLAIM OF PRIORITY

This application claims the benefit of Korean Patent Application No. 2006-0092341 filed on Sep. 22, 2006, in the Korean Intellectual Property Office, the disclosure of which is incorporated herein by reference.

BACKGROUND OF THE INVENTION

1. Field of the Invention

The present invention relates to a color interpolation method, and more particularly, to a color interpolation method capable of more precisely interpolating each of pixels of an image passing through a color filter of Bayer pattern and detected by an image sensor.

2. Description of the Related Art

In general, an image sensor converts brightness and wavelength, of light from an object, detected from pixels to electric values by utilizing a property that a semiconductor reacts to light. The images captured by a digital image storing means with a single complementary metal oxide semiconductor (CMOS) or a charge coupled device (CCD) image sensor equipped therein do not have all of red, green and blue components for each pixel. This is because, in order to realize a color image, the image sensor outputs only one component of the three primary colors from each pixel position using a color filter array composed of red, green and blue.

Figure 1:
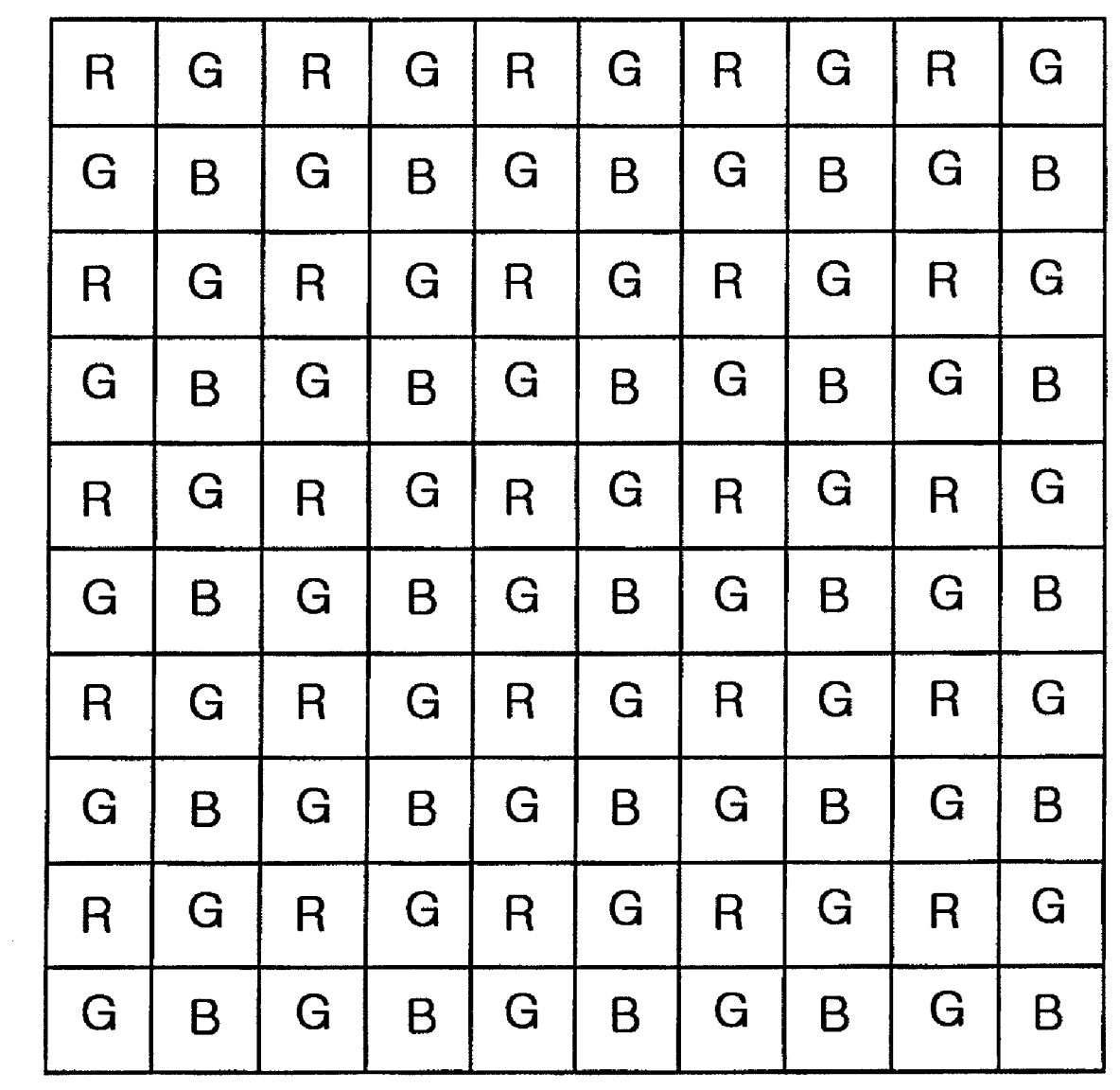

FIG. 1 exemplifies a color filter array (CFA) having a Bayer pattern. The Bayer pattern is the most generally widely used color filter array, in which a green component accounts for 50% the entire photocells of the color filter, considering that the human visual system is most sensitive to a luminance component, i.e., green, and the rest of the red and blue filters are alternately repeated. Therefore, in order for digital image storing equipment such as digital still cameras, mobile phone cameras and the like to process image signals obtained from the color filter array having such a Bayer pattern, the color component of each of the pixels need to be interpolated to have complete red, green and blue components.

Examining the conventionally generally used technologies for such color interpolation, the most representative methods of low complexity and a decreased load of hardware include nearest neighbor interpolation using the nearest neighbor pixel values of the same color component and bilinear interpolation using an average of pixel values adjacent to a center pixel. In addition, the technology has been advanced to modification of the above-described methods or adoption of the methods in consideration of directivity of horizontal and vertical edges in a certain pixel region. However, despite the simplicity of algorithm, these methods have drawbacks such as false color error and moiré effect, in which a false color is interpolated in an outline or an edge of an object to result in unattractive colors.

In order to improve such drawbacks and increase the capacity of color interpolation, there have been suggested various technologies, which restore colors using more advanced and diverse forms of algorithm based on the importance of pixels in an edge. In these technologies, interpolation for the green channel is completed first and then interpolation for the red and blue channels is performed. However, since these methods disadvantageously require additional memory and increase the load of hardware, they are not readily applicable to color interpolation of color filter array images used for mobile phone cameras. Also, some images according to these methods exhibit false color error or aliasing with partially false colors, despite more complicated algorithm. Furthermore, since the color interpolation methods described above do not consider a noise component obtained from the image sensor at all, the noise component of the image is increased, causing false color error when the algorithm is applied to the inputted image.

SUMMARY OF THE INVENTION

An aspect of the present invention provides a color interpolation method capable of eliminating noise without using additional memory with enhanced capacity of color interpolation.

According to an aspect of the invention, there is provided a color interpolation method including: defining a pixel group of a matrix structure, having a pixel to be color-interpolated as a center pixel, in an image passed through a color filter of Bayer pattern and detected by an image sensor; determining whether an edge exists or not in the pixel group; interpolating a color of the center pixel using a low pass filter when an edge does not exist in the pixel group; and interpolating a color of the center pixel according to directivity of an edge when the edge exists in the pixel group.

The defining a pixel group may include defining a pixel group of a 5×5 matrix structure in which a pixel to be color-interpolated is the center pixel and 5 pixels are positioned in a horizontal direction and a vertical direction, respectively.

More particularly, the defining a pixel group may include: defining a pixel group as a first type pixel group, in which a color detected from the center pixel of the pixel group is green and a pixel from which red is detected is disposed in a horizontal direction of the center pixel; defining a pixel group as a second type pixel group, in which a color detected by the center pixel of the pixel group is green and a pixel from which blue is detected is disposed in a horizontal direction of the center pixel; defining a pixel group as a third type pixel group, in which a color detected from the center pixel of the pixel group is red; and defining a pixel group as a fourth type pixel group, in which a color detected from the center pixel of the pixel group is blue.

The interpolating color of the center pixel using a low pass filter may include: determining a weighted average value of a color value detected from the center pixel and color values of a plurality of pixels, from which the same color as the center pixel is detected, in the pixel group, as an interpolated color value of the center pixel for the color detected from the center pixel; and determining weighted average values, for respective colors, of color values of the plurality of pixels, from which colors different from the color detected from the center pixel are detected, in the pixel group, as interpolated color values of the center pixel for the colors not detected from the center pixel. In this case, the weighted average value may be obtained by applying a smaller weight to a color value of a pixel positioned farther from the center pixel.

The determining whether or not an edge exists or not may include: calculating vertical and horizontal pixel value change amounts in the pixel group by using Gradient and Laplacian techniques; comparing the horizontal and vertical pixel value change amounts with respective critical values corresponding to horizontal and vertical directions, respectively; determining that an edge component does not exist in the pixel group when the vertical and horizontal pixel value change amounts are smaller than the respective critical values; and determining that an edge component exists in the pixel group when at least one of the vertical and horizontal pixel value change amounts is larger than the respective critical values.

The interpolating a color of the center pixel according to directivity of an edge may include: comparing the horizontal change amount with the vertical change amount, and determining that a vertical edge exists when the horizontal change amount is larger, and determining that a horizontal edge exists when the vertical change amount is larger, and determining that both vertical and horizontal edges exist when the vertical change amount is identical to the horizontal change amount; interpolating the color of the center pixel using pixels existing in a vertical direction with respect to the center pixel when it is determined that the vertical edge exists; interpolating the color of the center pixel using pixels existing in a vertical direction with respect to the center pixel when it is determined that the horizontal edge exists; and interpolating the color of the center pixel using pixels existing in vertical and horizontal directions when it is determined that both the vertical and horizontal edges exist.

When it is determined that the vertical edge exists, the method may further include: comparing a change amount between the center pixel and at least one pixel belonging to a column adjacent to the center pixel in a left side of the pixel group with a change amount between the center pixel and at least one pixel belonging to a column adjacent to the center pixel in a right side of the pixel group, after the interpolating a color of the center pixel according to directivity of an edge; additionally interpolating the center pixel using pixels belonging to a column adjacent to the center pixel in the right side of the pixel group when a value obtained by subtracting the change amount between the center pixel and at least one pixel belonging to the column adjacent to of the center pixel in the right side of the pixel group from the change amount between the center pixel and at least one pixel belonging to the column adjacent to the center pixel in the left side of the pixel group is larger than a predetermined critical value; additionally interpolating the center pixel using pixels belonging to the column adjacent to the center pixel in the left side of the pixel group when a value obtained by subtracting the change amount between the center pixel and at least one pixel belonging to the column adjacent to the center pixel in the right side of the pixel group from the change amount between the center pixel and at least one pixel belonging to the column adjacent to the center pixel in the left side of the pixel group is smaller than a predetermined critical value; and additionally interpolating the center pixel using pixels belonging to the column adjacent to the center pixel in the left and right sides of the center pixel when a value obtained by subtracting the change amount between the center pixel and at least one pixel belonging to the column adjacent to the center pixel in the right side of the pixel group from the change amount between the center pixel and at least one pixel belonging to the column adjacent to the center pixel in the left side of the pixel group is identical to a predetermined critical value.

When it is determined that the horizontal edge exists, the method may further include: comparing a change amount between the center pixel and at least one pixel belonging to a column adjacent to the center pixel in an upper side of the pixel group with a change amount between the center pixel and at least one pixel belonging to a column adjacent to the center pixel in a lower side of the pixel group, after the interpolating a color of the center pixel according to directivity of an edge; additionally interpolating the center pixel using pixels belonging to a row adjacent to the center pixel in the lower side of the pixel group when a value obtained by subtracting the change amount between the center pixel and at least one pixel belonging to the row adjacent to the center pixel in the lower side of the pixel group from the change amount between the center pixel and at least one pixel belonging to the row adjacent to the center pixel in the upper side of the pixel group is larger than a predetermined critical value; additionally interpolating the center pixel using pixels belonging to the row adjacent to the center pixel in the upper side of the pixel group when a value obtained by subtracting the change amount between the center pixel and at least one pixel belonging to the row adjacent to the center pixel in the lower side of the pixel group from the change amount between the center pixel and at least one pixel belonging to the column adjacent to the center pixel in the upper side of the pixel group is smaller than a predetermined critical value; and additionally interpolating the center pixel using pixels belonging to the rows adjacent to the center pixel in the upper and lower sides of the center pixel when a value obtained by subtracting the change amount between the center pixel and at least one pixel belonging to the row adjacent to the center pixel in the lower side of the pixel group from the change amount between the center pixel and at least one pixel belonging to the column adjacent to the center pixel in the upper side of the pixel group is identical to a predetermined critical value.

In the above-described additional interpolation operations, a green color value interpolated from the center pixel may be used in the above additional interpolating operations when the color detected by the center pixel is not green.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a diagram illustrating a conventional color filter of Bayer pattern;

FIGS. 6A to 6D are diagrams illustrating the types of pixel groups applicable to the method of color interpolation according to an exemplary embodiment of the present invention;

FIG. 7A is a diagram illustrating pixels used for calculating a vertical edge, and FIG. 7B is a diagram illustrating pixels used for calculating a horizontal edge;

FIG. 8A is a diagram showing pixel coordinates in a first type pixel group, and FIG. 8B is a diagram showing pixel coordinates in a third type pixel group;

FIG. 9A to 9C are diagrams illustrating a pixel group having both vertical and horizontal edges, a pixel group having a horizontal edge, and a pixel group having a vertical edge;

FIG. 10A is a diagram illustrating pixels used for precise edge detection in additional interpolation for the first and second type pixel groups, and FIG. 10B is a diagram illustrating pixels used for precise edge detection in additional interpolation of the third and fourth type pixel groups;

FIGS. 11A to 11C are diagrams illustrating pixels used for additional interpolation for a vertical edge; and FIGS. 12A to 12C are diagrams illustrating pixels used for additional interpolation for a horizontal edge.

DETAILED DESCRIPTION OF THE PREFERRED EMBODIMENT

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In addition, the terms are defined herein in consideration of functions, which are subject to the intention or convention of a person with ordinary skill in the art, and thus should not be understood as limiting the technical components of the present invention.

Figure 2:
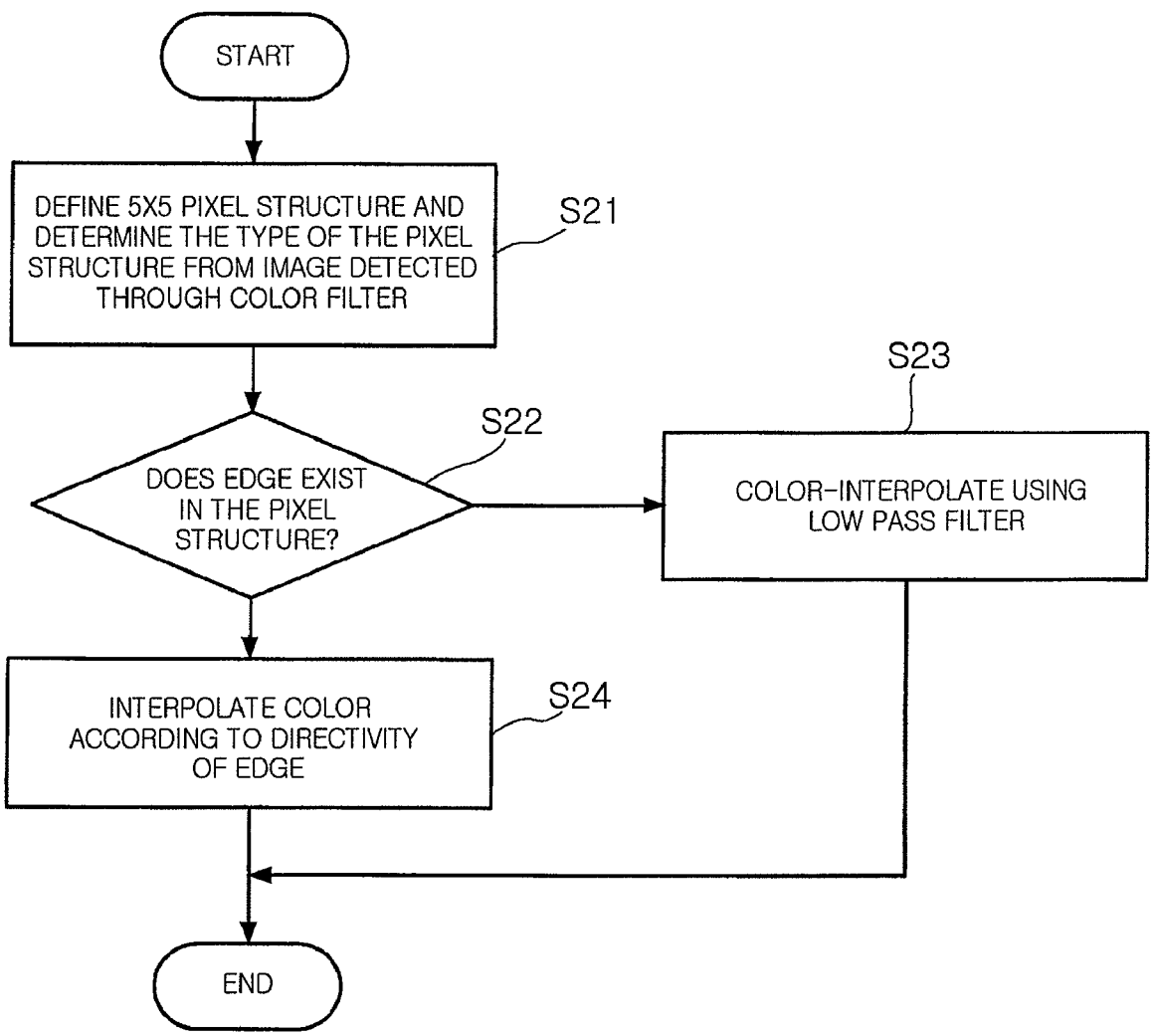
FIG. 2 is a flowchart illustrating a method of color interpolation according to an exemplary embodiment of the present invention.

FIG. 2 is a flowchart illustrating a method of color interpolation according to an exemplary embodiment of the present invention.

Referring to FIG. 2, the method of color interpolation according to the present invention broadly includes defining a pixel group of a matrix structure made up of a predetermined number of pixels in horizontal and vertical directions, respectively, from an image passing through a color filter of Bayer pattern and detected by an image sensor, S21; determining whether or not an edge exists in the pixel group, S22; interpolating color of the pixel group using a low pass filter when an edge does not exist in the pixel group, S23; and interpolating color of the pixel group according to directivity of the edge when an edge exists in the pixel group, S24.

First, in the operation of defining the pixel group, S21, a pixel group of a matrix structure made up of a plurality of pixels in horizontal and vertical directions about a pixel to be color-interpolated is defined, in order to perform color interpolation of an image passing through a color filter of Bayer pattern and detected by an image sensor. The pixel group may be formed in a 5×5 matrix structure made up of 5 pixels in horizontal and vertical directions, respectively.

Figures 6A, 6B, 6C, 6D:
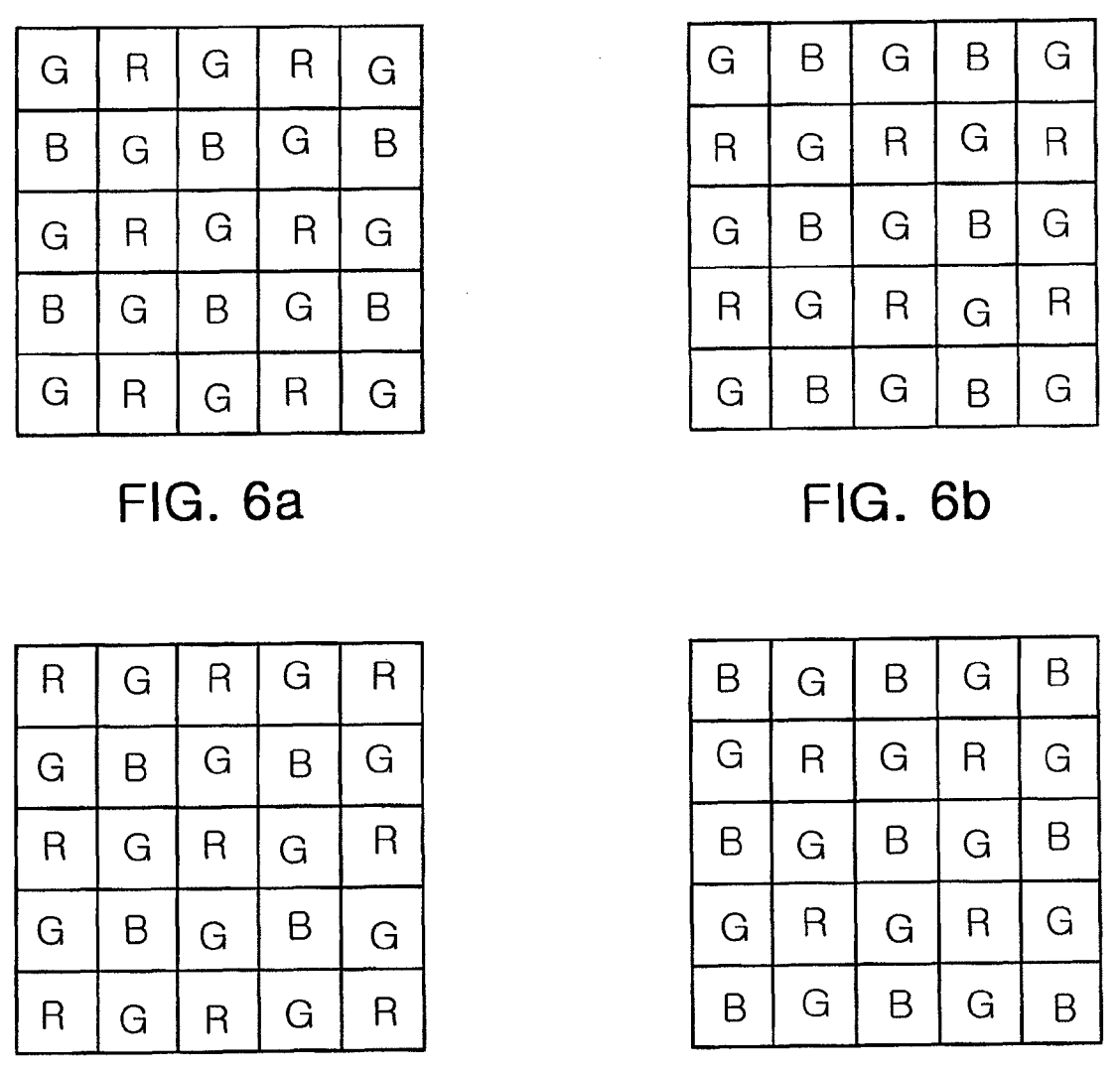

FIGS. 6A to 6D illustrate the types of pixel groups of 5×5 matrix structures, each employing a color filter of Bayer pattern, defined as below. FIG. 6A illustrates a pixel group in which a green component is detected from the center pixel (G pixel), which is horizontally adjacent to a pixel from which a red component is detected (R pixel) and vertically adjacent to a pixel from which a blue component is detected (B pixel). Therefore, the pixel group illustrated in FIG. 6A is referred to as a first type pixel group. In addition, FIG. 6B illustrates a pixel group in which a center pixel is a G pixel horizontally adjacent to a B pixel and vertically adjacent to an R pixel. Hereinafter, the pixel group illustrated in FIG. 6B is referred to as a second type pixel group. In addition, FIG. 6C illustrates a pixel group with a center pixel of R pixel. Hereinafter, the pixel group illustrated in FIG. 6C is referred to as a third type pixel group. In addition, FIG. 6D illustrates a pixel group with a center pixel of B pixel. Hereinafter, the pixel group illustrated in FIG. 6D is referred to as a fourth type pixel group. Different methods of detecting and interpolating the edge are applied to the various pixel groups defined as above.

Next, in the operation of determining whether or not an edge exists in the pixel group, S22, a value of $\Delta T\_H$, which is a vertical change amount, and a value of $\Delta T\_V$, which is a horizontal change amount, are calculated according to the following Equation 1 by using the Gradient and Laplacian techniques, and the change amounts are compared with predetermined critical values to determine whether or not an edge exists. FIGS. 7A and 7B illustrate positions of pixels used in the Equation 1. In particular, FIG. 7A shows pixels used for calculating a vertical edge, and FIG. 7B shows pixels used for calculating a horizontal edge.

[Equation 1]

$$\Delta V = |P23 - P43| + |2 \cdot P33 - P13 - P53|$$

$$\Delta H = |P32 - P34| + |2 \cdot P33 - P31 - P35|$$

$$\Delta v1 = |P32 - P12| + |P32 - P52|$$

$$\Delta v2 = |P34 - P14| + |P34 - P54|$$

$$\Delta h1 = |P23 - P21| + |P23 - P25|$$

$$\Delta h2 = |P43 - P41| + |P43 - P45|$$

$$\Delta V_T = \Delta V + \Delta v1 + \Delta v2$$

$$\Delta H_T = \Delta H + \Delta h1 + \Delta h2$$

In the above Equation 1, Pij denotes a pixel of i row and j column, $\Delta V$ denotes a change amount of pixel values in a vertical column including the center pixel; $\Delta V$ denotes a change amount of pixel values in a horizontal row including the center pixel; $\Delta v1$ and $\Delta v2$ denote change amounts of pixel values in vertical columns adjacent to the center pixel, respectively; and $\Delta h1$ and $\Delta h2$ denote change amounts of pixel values in horizontal rows adjacent to the center pixel, respectively. In addition, $\Delta V_T$ denotes a change amount of vertical pixel values in the entire pixel group, and $\Delta H_T$ denotes a change amount of horizontal pixel values in the entire pixel group.

Hereinafter, a pixel value or a color value of a pixel will be denoted as following. Pij denotes a pixel value of a pixel of i row and j column in a pixel group of a matrix structure, Gij denotes a green color value (G value) of a pixel of i row and j column in a pixel group of a matrix structure, Rij denotes a red color value (R value) of a pixel of i row and j column in a pixel group of a matrix structure, and Bij denotes a blue color value (B value) of a pixel of i row and j column in a pixel group of a matrix structure.

As shown in the above Equation 1, using the pixel values of the center pixel and the pixels adjacent to the center pixel, change amounts of the pixel values are calculated by Gradient and Laplacian techniques with respect to vertical and horizontal directions, and the change amounts are compared with predetermined critical values to determine whether or not one of a vertical edge and a horizontal edge exists in the pixel group, for all the four types of pixel groups described above.

That is, when both horizontal and vertical change amounts $\Delta V_T$, and $\Delta H_T$ are smaller than the respective predetermined critical values, it is determined that an edge does not exist in the pixel group, but in the rest of the conditions, it is determined that one of a vertical edge and a horizontal edge exists. That is, when at least one of the horizontal and vertical change amounts is larger than the respective critical values and the horizontal change amount is larger than the vertical change amount, it is determined that a vertical edge exists. On the other hand, at least one of the horizontal and vertical change amounts is larger than the respective critical values and the vertical change amount is larger than the horizontal change amount, it is determined that a horizontal edge exists. Determining whether the edge is formed in a vertical direction or a horizontal direction as described above is applied to the operation of interpolating the center pixel when an edge exists, which will be described later.

In the meantime, when it is determined that an edge does not exist in the operation of determining whether an edge exists or not, S22, the pixel group is determined as an edgeless region, and the center pixel is interpolated by employing a low pass filter, S23. For the sake of convenience, the interpolation performed when an edge does not exist is referred to as a first interpolation operation. Particularly, the present invention accommodates elimination of noise component generated in the image sensor by interpolating the color value detected by the center pixel in the first interpolation operation employing the low pass filter. For example, when the center pixel is a G pixel from which green is detected, not only an R value and a B value, which are the red and blue color values of the center pixel, are interpolated, but also a G value detected from the center pixel is interpolated. In addition, the present invention further decreases the noise generated when photographing at a low luminous intensity by adjusting the critical values, thereby decreasing a load used for eliminating the noise in a subsequent operation of processing the image signals. When it is determined that an edge does not exist, the operation of interpolating the center pixel may be expressed by the following Equation 2, in a pixel group having a 5×5 matrix structure. The following Equation 2 is described with reference to FIGS. 8A and 8B. FIG. 8A illustrates the pixel coordinates in the first pixel group, and FIG. 8B illustrates the pixel coordinates in the third pixel group. The second and fourth pixel groups may be configured by switching the positions of R pixel and B pixel from the configurations of FIGS. 8A and 8B, respectively, and thus additional drawings are not provided.

[Equation 2]
First pixel group:

$$G33\_inter=(4\cdot G33+2\cdot G22+2\cdot G24+2\cdot G42+2\cdot G44+G13+G21+G25+G53)/1\ 6$$

$$R33\_inter=(2\cdot R32+2\cdot R34+R12+R14+R52+R54)/8$$

$$B33\_inter=(2\cdot B23+2\cdot B43+B21+B25+B41+B45)/8$$

Second pixel group:
Identical to the interpolation equation of the first type except switching the positions of R and B
Third pixel group:

$$G33\_inter=(G23+G32+G34+G43)/4$$

$$R33\_inter=(4\cdot R33+R13+R31+R35+R53)/8$$

$$B33\_inter=(B22+B24+B42+B44)/4$$

Fourth pixel group:
Identical to the interpolation equation of the third type except switching the positions of R and B In the above Equation 2, the subscript '_inter' represents color values of green, red and blue of the interpolated center pixel, which applies to the rest the specification as well. As shown in the above Equation 2, in the first interpolation operation performed when an edge does not exist, a weighted average value of a color value detected from the center pixel and color values of a plurality of pixels, from which the same color as the center pixel is detected, in the pixel group, is determined as an interpolated color value of the center pixel for the color detected from the center pixel.

In addition, weighted average values, for respective colors, of color values of the plurality of pixels, from which colors different from the color detected from the center pixel are detected, in the pixel group, are determined as interpolated color values of the center pixel for the colors not detected from the center pixel. For example, when interpolating the color value of the center pixel in the first type pixel group, the color value G33 of the center pixel is multiplied by a weight of 4 in order to obtain a color value of green detected by the center pixel, and neighboring color values of the G pixel are multiplied by weights of 2 and 1. The multiplied values are added and the sum is divided by a sum of the weights to determine the green color value G33_inter of the center pixel. In addition, the red color value and the blue color value detected from the pixels in the pixel group are multiplied by weights of 2 and 1, and the multiplied values are added and the sum is divided by a sum of the weights to determine red and blue color values R33_inter and B33_inter of the center pixel. A smaller weight may be applied to a pixel farther away from the center pixel.

Next, when it is determined that an edge exists as a result of determining whether or not an edge exists in the pixel group, S22, the center pixel of the pixel group is interpolated in accordance with the directivity of the edge, S24. For the sake of convenience in description, the interpolation of the center pixel performed according to the directivity of the edge is referred to as a second interpolation operation. In the second interpolation operation, S24, in which the color of the center pixel is interpolated according to the directivity of the edge, the center pixel is interpolated according to the directivity of the edge determined by horizontal and vertical amounts. This operation, S24, will be explained in greater detail with reference to FIGS. 3 to 5.

Figure 3:
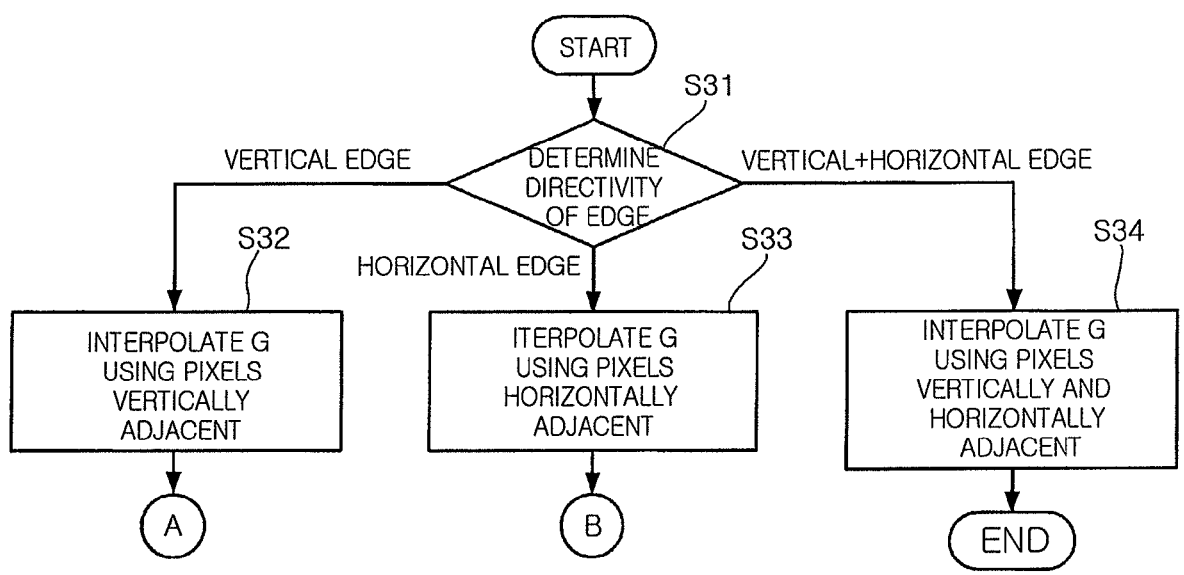
FIG. 3 is a flowchart illustrating a part of the color interpolation method when an edge exists in a pixel group, according to an exemplary embodiment of the present invention.

Referring to FIG. 3, the interpolating the color of the center pixel according to the directivity of an edge (S24 of FIG. 2) may include determining the directivity of the edge, S31; interpolating the color of the center pixel using pixels existing in a vertical direction of the center pixel when it is determined that a vertical edge exists, S32; interpolating the color of the center pixel using pixels existing in a horizontal direction of the center pixel when it is determined that a horizontal edge exists, S33; and interpolating the color of the center pixel using pixels existing in vertical and horizontal directions of the center pixel when it is determined that both vertical and horizontal edges exist, S34. FIGS. 9A to 9C illustrate a pixel group having both vertical and horizontal edges, a pixel group having a horizontal edge, and a pixel group having a vertical edge.

As previously described in the operation of determining whether or not an edge exists, S22, the operation of the determining the directivity of an edge, S31, includes comparing the horizontal change amount and the vertical change amount of the pixel values. In this case, when at least one of the horizontal and vertical change amounts is smaller than the respective predetermined critical values and the horizontal change amount is greater than the vertical change amount, it is determined that a vertical edge exists. On the other hand, when at least one of the horizontal and vertical change amounts is smaller than the respective predetermined critical values and the vertical change amount is greater than the horizontal change amount, it is determined that a horizontal edge exists.

Then, when it is determined that a vertical edge exists, the color of the center pixel is interpolated using color values of pixels vertically adjacent to the center pixel, along the direction of the edge. In particular, the interpolation of the center pixel is performed for the color vertically adjacent to the center pixel. For example, in the case of the first type pixel group in which a center pixel is a green pixel vertically adjacent to a blue pixel, the second interpolation operation of the center pixel is performed for the blue.

Likewise, when it is determined that a horizontal edge exists, the color of the center pixel is interpolated using the color values of pixels horizontally adjacent to the center pixel. In particular, the interpolation of the center pixel is performed for the colors horizontally adjacent to the center pixel. For example, in the case of the first type pixel group in which a center pixel is a green pixel horizontally adjacent to a red pixel, the second interpolation of the center pixel is performed for the red.

When it is determined that both the horizontal and vertical edges exist, the color of the center pixel is interpolated using pixels vertically and horizontally adjacent to the center pixel and pixels adjacent to the pixels vertically and horizontally adjacent to the center pixels. In this case, the interpolation of the center pixel is performed for all of the red, blue and green.

The method of interpolating the color of the center pixel along the direction of the edge may be expressed by the following Equations 3 to 5. The Equation 3 is for interpolating the color value of the center pixel when a vertical edge exists in a 5×5 pixel group, the Equation 4 is for the case when a horizontal edge exists, and the Equation 5 is for interpolating the color value of the center pixel when both vertical and horizontal edges exist.

[Equation 3]
In the case of the first type pixel group:

$$G33\_inter = G33$$

$$B33\_inter = (B23 + B43)/2 + \left(\left(G33 - \frac{G33+G13}{2}\right) + \left(G33 - \frac{G33+G53}{2}\right)\right)/4$$

In the case of the second type pixel group:
Identical to the interpolation equation of the first type except switching the positions of B and R
In the case of the third type pixel group:

$$G33\_inter = (G23+G43)/2 + \left(\left(R33 - \frac{R33+R13}{2}\right) + \left(R33 - \frac{R33+R53}{2}\right)\right)/2$$

$$R33\_inter = R33$$

In the case of the fourth type pixel group:
Identical to the interpolation equation of the third type except switching the positions of R and B
[Equation 4]
In the case of the first type pixel group:

$$G33\_inter = G33$$

$$R33\_inter = (R23+R43)/2 + \left(\left(G33 - \frac{G33+G31}{2}\right) + \left(G33 - \frac{G33+G35}{2}\right)\right)/4$$

In the case of the second type pixel group:
Identical to the interpolation equation of the first type except switching the positions of R and B In the case of the third type pixel group:

$$G33\_inter = (G32+G34)/2 + \left(\left(R33 - \frac{R33+R31}{2}\right) + \left(R33 - \frac{R33+R35}{2}\right)\right)/2$$

$$R33\_inter = R33$$

In the case of the fourth type pixel group:
Identical to the interpolation equation of the third type except switching the positions of R and B
[Equation 5]
In the case of the first type pixel group:

$$G33\_inter = G33$$

$$R33\_inter = (R32+R34)/2 + \left(\left(G33 - \frac{G22+G31+G33+G42}{4}\right) + \left(G33 - \frac{G24+G33+G35+G44}{4}\right)\right)/4$$

$$B33\_inter = (B23+B43)/2 + \left(\left(G33 - \frac{G13+G22+G24+G33}{4}\right) + \left(G33 - \frac{G33+G42+G44+G53}{4}\right)\right)/4$$

In the case of the second type pixel group:
Identical to the interpolation equation of the first type except switching the positions of R and B
In the case of the third type pixel group:

$$G33\_inter = (G23+G32+G34+G43)/4 + \left(\left(R33 - \frac{R33+R13}{2}\right) + \left(R33 - \frac{R33+R53}{2}\right) + \left(R33 - \frac{R33+R31}{2}\right) + \left(R33 - \frac{R33+R35}{2}\right)\right)/4$$

$$R33\_inter = R33$$

$$B33\_inter = (B22+B24+B42+B44)/4 + \left(\left(G33 - \frac{G12+G21+G23+G32}{4}\right) + \left(G33 - \frac{G14+G23+G25+G34}{4}\right) + \left(G33 - \frac{G32+G41+G43+G52}{4}\right) + \left(G33 - \frac{G34+G43+G45+G54}{4}\right)\right)/4$$

In the case of the fourth type pixel group:
Identical to the interpolation equation of the third type except switching the positions of R and B As described in the above Equations 3 to 5, the method of color interpolation according to the present invention entails calculation including adding an average of neighboring color components identical to the color component to be interpolated and an average of change amounts in respective edge directions, in consideration of the directivity of the edge determined with respect to the center pixel of the pixel group. In this case, the change amount is obtained by the differences between the color value of the center pixel and the neighboring pixel values from which the same color as the center pixel is detected. That is, when interpolating the red color value and the blue color value, the change amount of the green component is considered, and when interpolating the green component, the change amount of one of the red component and the blue component is considered.

In addition, according to the present invention, in order to interpolate color of the center pixel in consideration of more precise directivity of the edge, additional interpolation is performed using differences between the green color value of the center pixel interpolated through the above-described interpolation process and the neighboring green pixel values adjacent to the center pixel in upper and lower, left and right sides and diagonal directions of the center pixel. Through this additional interpolation process, interpolation is performed for the colors not interpolated initially. The additional interpolation process will now be described with reference to FIGS. 4, 5 and 10A to 12C.

Figure 4:
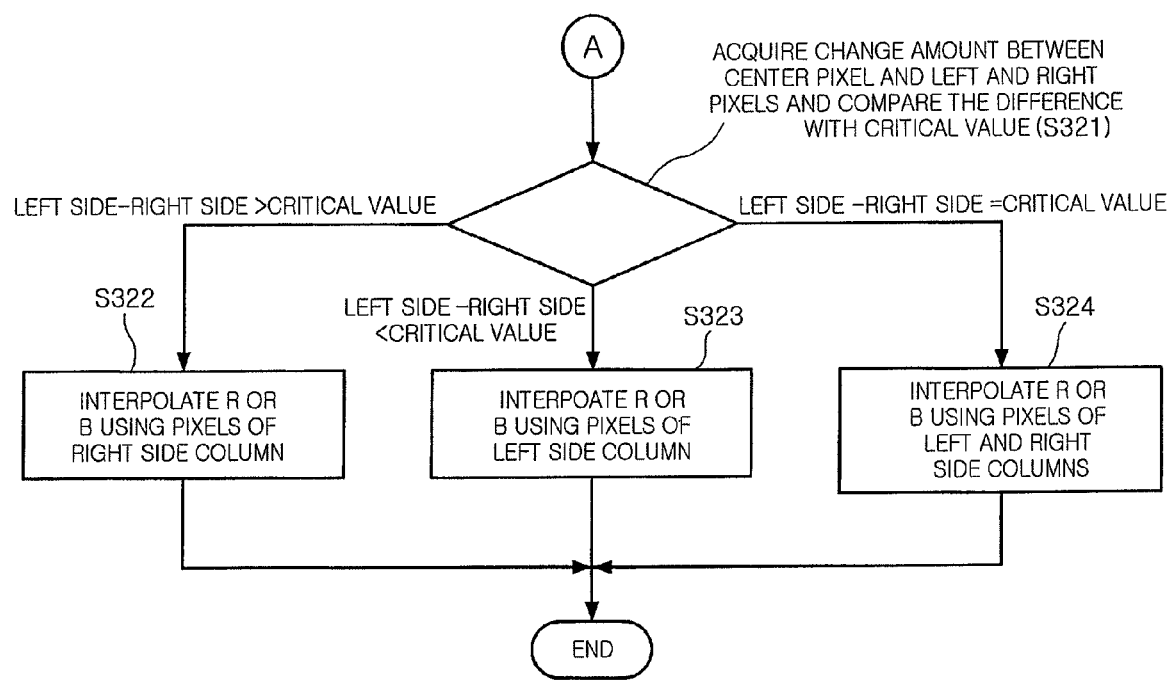
FIG. 4 is a flowchart illustrating another part of the color interpolation method when an edge exists in a pixel group, according to an exemplary embodiment of the present invention.

FIG. 4 is a flowchart describing the additional interpolation performed when a vertical edge exists.

Referring to FIG. 4, after the second interpolation operation, a change amount between the center pixel and at least one pixel belonging to column adjacent to the center pixel in a left side of the pixel group is compared with a change amount between the center pixel and at least one pixel belonging to a column adjacent to the center pixel in a right side of the pixel group, S321. The pixels used in the operation of comparing the change amounts are illustrated in FIGS. 10A and 10B. As shown in FIG. 10A, in the first and second type pixel groups, where the center pixel is a G pixel, the color value of the center pixel is compared with the color values of the pixels adjacent to the center pixel in diagonal directions of the center pixel. In addition, as shown in FIG. 10B, in the third and fourth type pixel groups where the center pixel is an R pixel or a B pixel, the interpolated green color value G33_inter of the center pixel is compared with the color values of the pixels vertically and horizontally adjacent to the center pixel.

When a vertical edge exists, an example of calculating the change amounts between the color value of the center pixel and pixels belonging to the columns adjacent to the center pixel in the left and right sides of the center pixel in the operation of comparing, S321, after the second type interpolation, may be expressed by the following Equation 6.

[Equation 6]
In the case of the first and second type pixel groups:

$$\Delta s\_h1 = |P33-P22|+|P33-P42|$$

$$\Delta s\_h2 = |P33-P24|+|P33-P44|$$

In the case of the third and fourth type pixel groups:

$$\Delta s\_h1 = |G33\_inter-P32|$$

$$\Delta s\_h2 = |G33\_inter-P34|$$

The differences between the change amounts calculated in the above Equation 6 are compared with respective predetermined critical values, and additional interpolation is performed according to results of the comparison.

Figures 11A, 11B, 11C:
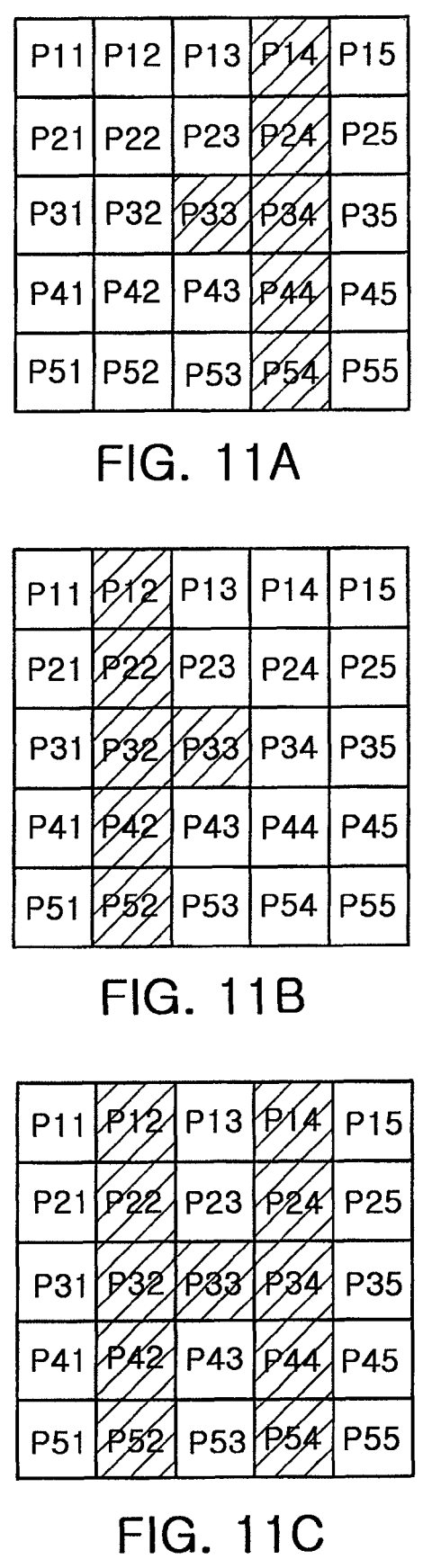

First, when the value obtained by subtracting the change amount between the center pixel and at least one pixel belonging to the column adjacent to the center pixel in the right side of the pixel group from a change amount between the center pixel and at least one pixel belonging to the column adjacent to the center pixel in the left side of the pixel group is greater than a predetermined critical value, that is, when a value of $\Delta s\_h1-\Delta s\_h2$ in the Equation 6 is greater than the predetermined critical value, the center pixel is additionally interpolated using pixels belonging to the column adjacent to the center pixel in the right side of the pixel group, S322. The pixels used in additional interpolation are illustrated in FIG. 11A. In this case, more particularly, the color value of the center pixel may be interpolated as in the following Equation 7.

[Equation 7]
In the case of the first type pixel group:

$$R33\_inter = \left(\frac{R34+R14}{2} + \frac{R34+R54}{2}\right)/2 + \left(\frac{(G33-G24)+}{(G33-G44)}\right)/2$$

In the case of the second type pixel group:
Same as the interpolation equation of the first type except switching R and B
In the case of the third type pixel group:

$$B33\_inter = (B24+B44)/2 + \left(\left(G33\_inter-\frac{G14+G34}{2}\right)+\left(G33\_inter-\frac{G34+G54}{2}\right)\right)/2$$

In the case of the fourth type pixel group:
Same as in the interpolation equation of the third type except switching R and B Next, when a value obtained by subtracting the change amount between the center pixel and at least one pixel belonging to the column adjacent to the center pixel in the right side of the pixel group from the change amount between the center pixel and at least one pixel belonging to the column adjacent to the center pixel in the left side of the pixel group is smaller than a predetermined critical value, that is, when a value of $\Delta s\_h1-\Delta s\_h2$ in the Equation 6 is smaller than the predetermined critical value, the center pixel is additionally interpolated using pixels belonging to the column adjacent to the center pixel in the left side of the pixel group, S323. The pixels used in this additional interpolation are illustrated in FIG. 11B. In this case, more particularly, the color value of the center pixel may be interpolated as in the following Equation 8.

[Equation 8]
In the case of the first type pixel group:

$$R33\_inter = \left(\frac{R12+R32}{2} + \frac{R32+R52}{2}\right)/2 + \left(\frac{(G33-G22)+}{(G33-G42)}\right)/2$$

In the case of the second type pixel group:
Identical to the interpolation equation of the first type except switching the positions of R and B
In the case of the third type pixel group:

$$B33\_inter = (B22+B42)/2 + \left(\left(G33\_inter-\frac{G12+G32}{2}\right)+\left(G33\_inter-\frac{G32+G52}{2}\right)\right)/2$$

In the case of the fourth type pixel group:
Identical to the interpolation equation of the third type except switching the positions of R and B Next, when a value obtained by subtracting the change amount between the center pixel and at least one pixel belonging to the column adjacent to the center pixel in the right side of the pixel group from the change amount between the center pixel and at least one pixel belonging to the column adjacent to the center pixel in the left side of the pixel group is identical to a predetermined critical value, that is, when a value of $\Delta s\_h1-\Delta s\_h2$ in the above Equation 6 is identical to the predetermined critical value, the center pixel is additionally interpolated using the pixels belonging to the columns adjacent to the center pixel in the left and right sides of the center pixel, S324. The pixels used in the additional interpolation are illustrated in FIG. 11C. In this case, the color values of the center pixel may be interpolated as in the following Equation 9.

[Equation 9]
In the case of the first type pixel group:

$$R33\_inter = \left(\frac{R34+R14}{2} + \frac{R34+R54}{2} + \frac{R12+R32}{2} + \frac{R32+R52}{2}\right)/4 + ((G33-G24)+(G33-G44)+(G33-G22)+(G33-G42))/4$$

In the case of the second type pixel group:
Identical to the interpolation equation of the first type except switching the positions of R and B In the case of the third type pixel group:

$$B33\_inter = (B22+B24+B44)/4 + \left(\left(G33\_inter - \frac{G14+G34}{2}\right) + \left(G33\_inter - \frac{G34+G54}{2}\right) + \left(G33\_inter - \frac{G12+G32}{2}\right) + \left(G33\_inter - \frac{G32+G52}{2}\right)\right)/4$$

In the case of the fourth type pixel group:
Identical to the interpolation equation of the third type except switching the positions of R and B The additional interpolation for the horizontal edge may be performed in a similar manner as the additional interpolation for the vertical edge described above.

Figure 5:
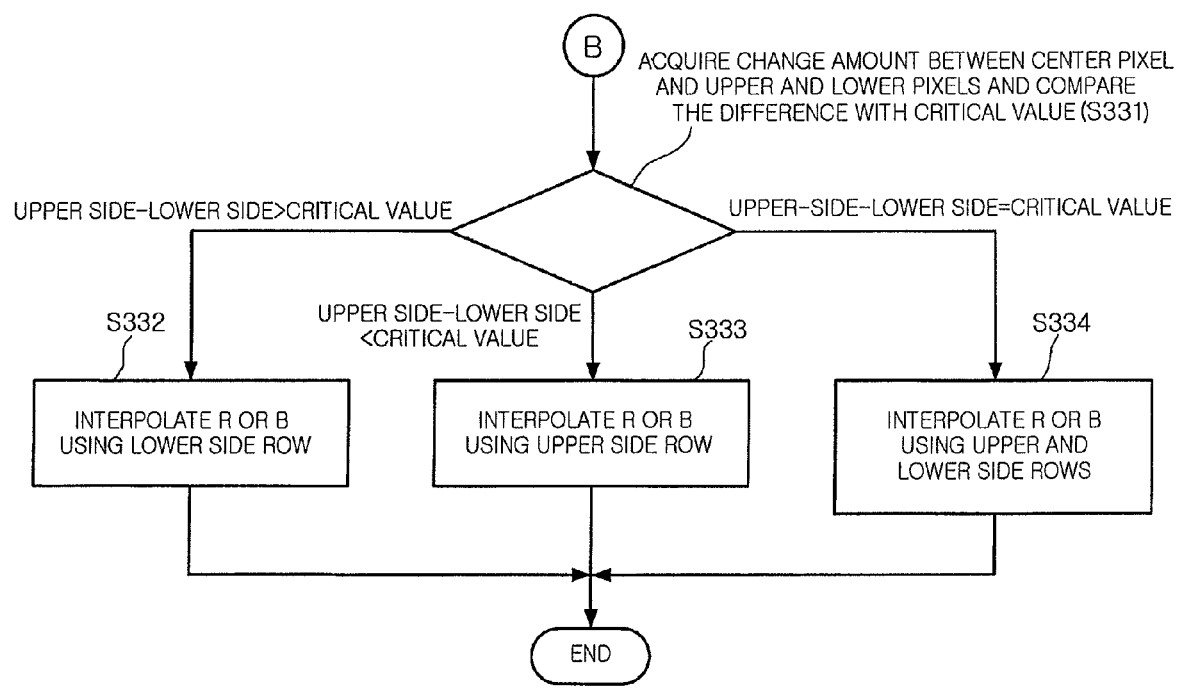
FIG. 5 is a flowchart illustrating still another part of the color interpolation method when an edge exists in a pixel group, according to an exemplary embodiment of the present invention.

Referring to FIG. 5, after the second interpolation operation, a change amount between the center pixel and at least one pixel belonging to a row adjacent to the center pixel in an upper side of the pixel group is compared with a change amount between the center pixel and at least one pixel belonging to a row adjacent to the center pixel in a lower side of the pixel group, S331. The pixels used in the operation of comparing the change amounts are illustrated in FIGS. 10A and 10B. As shown in FIG. 10A, in the first and second type pixel groups where a center pixel is a G pixel, the color value of the center pixel is compared with the color values of the pixels adjacent to the center pixel in diagonal directions of the center pixel. In addition, as shown in FIG. 10B, in the third and fourth type pixel groups where a center pixel is an R or B pixel, the interpolated green value G33_inter of the center pixel is compared with the color values of the pixels vertically and horizontally adjacent to the center pixel.

When a horizontal edge exists, an example of calculating change amounts between the color value of the center pixel, and pixels belonging to rows adjacent to the center pixel in the upper and lower sides of the center pixel in the operation of comparing, S331, after the second interpolation operation, may be expressed by the following Equation 10.

[Equation 10]
In the case of the first and second type pixel groups:

$$\Delta s\_v1 = |P33-P22|+|P33-P24|$$

$$\Delta s\_v2 = |P33-P42|+|P33-P44|$$

In the case of the third and fourth type pixel groups:

$$\Delta s\_v1 = |G33\_inter-P23|$$

$$\Delta s\_v2 = |G33\_inter-P43|$$

The differences between the change amounts calculated as in the above Equation 10 are compared with respective predetermined critical values, and additional interpolation of the center pixel is performed according to results of the comparison.

First, when a value obtained by subtracting the change amount between the center pixel and at least one pixel belonging to the row adjacent to the center pixel in the lower side of the pixel group from the change amount between the center pixel and at least one pixel belonging to the row adjacent to the center pixel in the upper side of the pixel group is greater than a predetermined critical value, that is, when a value of $\Delta s\_v1-\Delta s\_v2$ in the above Equation 10 is greater than the predetermined critical value, the center pixel is additionally interpolated using the pixels belonging to the row adjacent to the center pixel in the lower side of the pixel group, S332. The pixels used in the additional interpolation are illustrated in FIG. 12A. In this case, more particularly, the color values of the center pixel may be interpolated as in the following Equation 11.

[Equation 11]
In the case of the first type pixel group:

$$B3\_inter = \left(\frac{B43+B41}{2}+\frac{B43+B45}{2}\right)/2 + ((G33-G42)+(G33-G44))/2$$

In the case of the second type pixel group:
Identical to the interpolation equation of the first type except switching the positions of R and B In the case of the third type pixel group:

$$B33\_inter = (B42+B44)/2 + \left(\left(G33\_inter-\frac{G41+G43}{2}\right)+\left(G33\_inter-\frac{G43+G45}{2}\right)\right)/2$$

In the case of the fourth type pixel group:
Identical to the interpolation equation of the third type except switching the positions of R and B Next, when a value obtained by subtracting the change amount between the center pixel and at least one pixel belonging to the row adjacent to the center pixel in a lower side of the pixel group from the change amount between the center pixel and at least one pixel belonging to the row adjacent to the center pixel in the upper side of the pixel group is smaller than a predetermined critical value, that is, when a value of $\Delta s\_v1-\Delta s\_v2$ in the above Equation 10 is smaller than the predetermined critical value, the center pixel is additionally interpolated using the pixels belonging to the row adjacent to the center pixel in the upper side of the pixel group, S333. The pixels used in the additional interpolation are illustrated in FIG. 12B. In this case, more particularly, the color value of the center pixel may be interpolated as in the following Equation 12.

[Equation 12]

In the case of the first type pixel group:

$$B33\_inter = \left(\frac{B23+B21}{2} + \frac{B23+B25}{2}\right)/2 + ((G33-G22)+(G33-G24))/2$$

In the case of the second type pixel group:
Identical to the interpolation equation of the first type except switching the positions of R and B In the case of the third type pixel group:

$$B33\_inter = (B22+B24)/2 + \left(\left(G33\_inter - \frac{G12+G23}{2}\right) + \left(G33\_inter - \frac{G23+G25}{2}\right)\right)/2$$

In the case of the fourth type pixel group:
Identical to the interpolation equation of the third type except switching the positions of R and B Next, when a value obtained by subtracting the change amount between the center pixel and at least one pixel belonging to the row adjacent to the center pixel in the lower side of the pixel group from the change amount between the center pixel and at least one pixel belonging to the row adjacent to the center pixel in the upper side of the pixel group is identical to a predetermined critical value, that is, when a value of Δs_v1−Δs_v2 in the above Equation 10 is identical to the predetermined critical value, the center pixel is additionally interpolated using the pixels belonging to the rows adjacent to the center pixel in the upper and lower sides of the pixel group. The pixels used in the additional interpolation are illustrated in FIG. 12C. In this case, more particularly, the color value of the center pixel may be interpolated as in the following Equation 13.

[Equation 13]

In the case of the first type pixel group:

$$B33\_inter = \left(\frac{B43+B41}{2} + \frac{B43+B45}{2} + \frac{B23+B21}{2} + \frac{R23+R25}{2}\right)/4 + ((G33-G42)+(G33-G44)+(G33-G22)+(G33-G24))/4$$

In the case of the second type pixel group:
Identical to the interpolation equation in the first type except switching the positions of R and B In the case of the third type pixel group:

$$B33\_inter = (B22+B24+B42+B44)/4 + \left(\left(G33\_inter - \frac{G21+G23}{2}\right) + \left(G33\_inter - \frac{G23+G25}{2}\right) + \left(G33\_inter - \frac{G41+G43}{2}\right) + \left(G33\_inter - \frac{G43+G45}{2}\right)\right)/4$$

In the case of the fourth type pixel group:
Identical to the interpolation equation of the third type except switching the positions of R and B As described above, in the present invention, the center pixel of the pixel group is additionally interpolated according to specific edge directions using an interpolated green color value of the center pixel in a preceding interpolation operation, thereby enabling more precise interpolation.

According to the present invention set forth above, a low pass filter is applied to color interpolation, significantly decreasing noise. In addition, the color interpolation is performed by more precise detection of an edge, thereby enabling more precise color interpolation. Furthermore, the present invention allows excellent color interpolation without using additional memory.

While the present invention has been shown and described in connection with the exemplary embodiments, it will be apparent to those skilled in the art that modifications and variations may be made without departing from the spirit and scope of the invention as defined by the appended claims.

What is claimed is:

1. A color interpolation method, comprising:
defining a pixel group of a matrix structure, having a center pixel to be color-interpolated, in an image passed through a color filter of Bayer pattern and detected by an image sensor;
determining whether an edge of the image exists or not in the pixel group;
when an edge does not exist in the pixel group, interpolating a color value of the center pixel using a low pass filter; and
when an edge exists in the pixel group, interpolating a color value of the center pixel according to edge directivity of the edge,
wherein said defining comprises:
defining the pixel group of a 5×5 matrix structure, which has 5 rows in a horizontal direction and 5 columns in a vertical direction, in which 5 pixels are positioned in each row and each column of the matrix structure and a pixel to be color-interpolated is the center pixel;
defining the pixel group as a first type pixel group, in which a color detected from the center pixel in the pixel group is green and a pixel from which red is detected is disposed in the row containing the center pixel;
defining the pixel group as a second type pixel group, in which a color detected form the center pixel in the pixel group is green and a pixel from which blue is detected is disposed in the row containing the center pixel;
defining the pixel group as a third type pixel group, in which a color detected from the center pixel of the pixel group is red; and
defining the pixel group as a fourth type pixel group, in which a color detected from the center pixel of the pixel group is blue,
wherein said interpolating using the low pass filter comprises interpolating the color value of the center pixel by the following Equation 2:

Equation 2 for the first type pixel group:

$$G33\_inter=(4 \cdot G33+2 \cdot G22+2 \cdot G24+2 \cdot G42+2 \cdot G44+G13+G21+G25+G53)/16$$

$$R33\_inter=(2 \cdot R32+2 \cdot R34+R12+R14+R52+R54)/8$$

$$B33\_inter=(2 \cdot B23+2 \cdot B43+B21+B25+B41+B45)/8;$$

for the second type pixel group:

$$G33\_inter=(4 \cdot G33+2 \cdot G22+2 \cdot G24+2 \cdot G42+2 \cdot G44+G13+G21+G25+G53)/16$$

$B33\_inter=(2 \cdot B32+2 \cdot B34+B12+B14+B52+B54)/8$ $R33\_inter=(2 \cdot R23+2 \cdot R43+R21+R25+R41+R45)/8;$ for the third type pixel group:

$G33\_inter=(G23+G32+G34+G43)/4$ $R33\_inter=(4 \cdot R33+R13+R31+R35+R53)/8$ $B33\_inter=(B22+B24+B42+B44)/4;$ and for the fourth type pixel group:

$G33\_inter=(G23+G32+G34+G43)/4$ $B33\_inter=(4 \cdot B33+B13+B31+B35+B53)/8$ $R33\_inter=(R22+R24+R42+R44)/4,$ where Gmn is a green color value of a pixel of $m^{th}$ row and $n^{th}$ column, Rmn is a red color value of a pixel of $m^{th}$ row and $n^{th}$ column, Bmn is a blue color value of a pixel of $m^{th}$ row and $n^{th}$ column, G33_inter is an interpolated green color value of the center pixel, R33_inter is an interpolated red color value of the center pixel, and B33_inter is an interpolated blue color value of the center pixel.

2. The method of claim 1, wherein said interpolating using the low pass filter comprises:

for a first color detected from the center pixel, determining an interpolated color value of the first color for the center pixel by obtaining a weighted average value of a color value of the first color of the center pixel and color values of the first color of a plurality of other pixels, in the pixel group; and for second colors not detected from the center pixel, determining interpolated color values of the second colors for the center pixel by obtaining weighted average values, for respective the second colors, of color values of a plurality of other pixels, in the pixel group.

3. The method of claim 2, wherein when obtaining the weighted average value, a smaller weight is applied to a color value of a pixel positioned farther from the center pixel.

4. A color interpolation method, comprising:

defining a pixel group of a matrix structure, having a center pixel to be color-interpolated, in an image passed through a color filter of Bayer pattern and detected by an image sensor;

determining whether an edge of the image exists or not in the pixel group;

when an edge does not exist in the pixel group, interpolating a color value of the center pixel using a low pass filter; and when an edge exists in the pixel group, interpolating a color value of the center pixel according to edge directivity of the edge, wherein said defining comprises:

defining the pixel group of a 5×5 matrix structure, which has 5 rows in a horizontal direction and 5 columns in a vertical direction, in which 5 pixels are positioned in each row and each column of the matrix structure and a pixel to be color-interpolated is the center pixel;

defining the pixel group as a first type pixel group, in which a color detected from the center pixel in the pixel group is green and a pixel from which red is detected is disposed in the row containing the center pixel;

defining the pixel group as a second type pixel group, in which a color detected form the center pixel in the pixel group is green and a pixel from which blue is detected is disposed in the row containing the center pixel;

defining the pixel group as a third type pixel group, in which a color detected from the center pixel of the pixel group is red; and defining the pixel group as a fourth type pixel group, in which a color detected from the center pixel of the pixel group is blue, wherein said interpolating according to edge directivity comprises:

comparing a horizontal pixel value change amount with a vertical pixel value change amount, in the pixel group;

determining that edge directivity is vertical when the horizontal pixel value change amount is larger, or that edge directivity is horizontal when the vertical pixel value change amount is larger, or that edge directivity is both horizontal and vertical when the horizontal pixel value change amount is identical to the vertical pixel value change amount;

interpolating the color value of the center pixel by the following Equation 3 when edge directivity is vertical;

interpolating the color value of the center pixel by the following Equation 4 when edge directivity is horizontal; and interpolating the color value of the center pixel by the following Equation 5 when edge directivity is both horizontal and vertical, Equation 3 for the first type pixel group:

$G33\_inter = G33$ $B33\_inter =$
$(B23+B43)/2 + \left(\left(G33 - \frac{G33+G13}{2}\right) + \left(G33 - \frac{G33+G53}{2}\right)\right)/4;$ for the second type pixel group:

$G33\_inter = G33$ $R33\_inter =$
$(R32+R34)/2 + \left(\left(G33 - \frac{G33+G31}{2}\right) + \left(G33 - \frac{G33+G35}{2}\right)\right)/4;$ for the third type pixel group:

$G33\_inter =$
$(G34+G43)/2 + \left(\left(R33 - \frac{R33+R13}{2}\right) + \left(R33 - \frac{R33+R53}{2}\right)\right)/2$ $R33\_inter = R33;$ and for the fourth type pixel group:

$G33\_inter =$
$(G32+G34)/2 + \left(\left(R33 - \frac{R33+R31}{2}\right) + \left(R33 - \frac{R33+R35}{2}\right)\right)/2$ $R33\_inter = R33,$ where Gmn is a green color value of a pixel of m$^{th}$ row and n$^{th}$ column, Rmn is a red color value of a pixel of m$^{th}$ row and n$^{th}$ column, Bmn is a blue color value of a pixel of m$^{th}$ row and n$^{th}$ column, G33_inter is an interpolated green color value of the center pixel, R33_inter is an interpolated red color value of the center pixel, and B33_inter is an interpolated blue color value of the center pixel;

Equation 4 for the first type pixel group:

$$G33\_inter = G33$$

$$R33\_inter = (R32 + R34)/2 + \left(\left(G33 - \frac{G33+G31}{2}\right) + \left(G33 - \frac{G33+G35}{2}\right)\right)/4;$$

for the second type pixel group:

$$G33\_inter = G33$$

$$B33\_inter = (B32+B34)/2 + \left(\left(G33 - \frac{G33+G31}{2}\right) + \left(G33 - \frac{G33+G35}{2}\right)\right)/4;$$

for the third type pixel group:

$$G33\_inter = (G32+G34)/2 + \left(\left(R33 - \frac{R33+R31}{2}\right) + \left(R33 - \frac{R33+R35}{2}\right)\right)/2$$

$$R33\_inter = R33;\quad \text{and}$$

and for the fourth type pixel group:

$$G33\_inter = (G32+G34)/2 + \left(\left(B33 - \frac{B33+B31}{2}\right) + \left(B33 - \frac{B33+B35}{2}\right)\right)/2$$

$$B33\_inter = B33,\quad \text{and}$$

and

Equation 5 for the first type pixel group:

$$G33\_inter = G33$$

$$R33\_inter = (R32+R34)/2 + \left(\left(G33 - \frac{G22+G31+G33+G42}{4}\right) + \left(G33 - \frac{G24+G33+G35+G44}{4}\right)\right)/4$$

$$B33\_inter = (B23+B43)/2 + \left(\left(G33 - \frac{G13+G22+G24+G33}{4}\right) + \left(G33 - \frac{G33+G42+G44+G53}{4}\right)\right)/4;$$

for the second type pixel group:

$$G33\_inter = G33$$

$$B33\_inter = (B32+B34)/2 + \left(\left(G33 - \frac{G22+G31+G33+G42}{4}\right) + \left(G33 - \frac{G24+G33+G35+G44}{4}\right)\right)/4$$

$$R33\_inter = (R23+R43)/2 + \left(\left(G33 - \frac{G13+G22+G24+G33}{4}\right) + \left(G33 - \frac{G33+G42+G44+G53}{4}\right)\right)/4;$$

for the third type pixel group:

$$G33\_inter = (G23+G32+G34+G43)/4 + \left(\left(R33 - \frac{R33+R13}{2}\right) + \left(R33 - \frac{R33+R53}{2}\right) + \left(R33 - \frac{R33+R31}{2}\right) + \left(R33 - \frac{R33+R35}{2}\right)\right)/4$$

$$R33\_inter = R33 \quad B33\_inter = (B22+B24+B42+B44)/4 + \left(\left(G33 - \frac{G12+G21+G23+G32}{4}\right) + \left(G33 - \frac{G14+G23+G25+G34}{4}\right) + \left(G33 - \frac{G32+G41+G43+G52}{4}\right) + \left(G33 - \frac{G34+G43+G45+G54}{4}\right)\right)/4;$$

and for the fourth type pixel group:

$$G33\_inter = (G23+G32+G34+G43)/4 + \left(\left(B33 - \frac{B33+B13}{2}\right) + \left(B33 - \frac{B33+B53}{2}\right) + \left(B33 - \frac{B33+B31}{2}\right) + \left(B33 - \frac{B33+B35}{2}\right)\right)/4$$

$$B33\_inter = B33$$

$$R33\_inter = (R22+R24+R42+R44)/4 + \left(\left(G33 - \frac{G12+G21+G23+G32}{4}\right) + \left(G33 - \frac{G14+G23+G25+G34}{4}\right) + \left(G33 - \frac{G32+G41+G43+G52}{4}\right) + \left(G33 - \frac{G34+G43+G45+G54}{4}\right)\right)/4.$$

5. The method of claim 4, wherein said interpolating using the low pass filter comprises:
- for a first color detected from the center pixel, determining an interpolated color value of the first color for the center pixel by obtaining a weighted average value of a color value of the first color of the center pixel and color values of the first color of a plurality of other pixels, in the pixel group; and
- for second colors not detected from the center pixel, determining interpolated color values of the second colors for the center pixel by obtaining weighted average values, for respective the second colors, of color values of a plurality of other pixels, in the pixel group.

6. The method of claim 5, wherein when obtaining the weighted average value, a smaller weight is applied to a color value of a pixel positioned farther from the center pixel.

7. A color interpolation method, comprising:
- defining a pixel group of a matrix structure, having a center pixel to be color-interpolated, in an image passed through a color filter of Bayer pattern and detected by an image sensor;
- determining whether an edge of the image exists or not in the pixel group;
- when an edge does not exist in the pixel group, interpolating a color value of the center pixel using a low pass filter; and
- when an edge exists in the pixel group, interpolating a color value of the center pixel according to edge directivity of the edge,
- wherein said determining comprises:
- calculating vertical and horizontal pixel value change amounts by using Gradient and Laplacian techniques, wherein the vertical pixel value change amount is a change amount of pixel values of pixels arranged in a vertical direction in the pixel group and wherein the horizontal pixel value change amount is a change amount of pixel values of pixels arranged in a horizontal direction in the pixel group;
- comparing the horizontal and vertical pixel value change amounts with respective critical values corresponding to the horizontal and vertical directions, respectively;
- when the vertical and horizontal pixel value change amounts are smaller than the respective critical values, determining that an edge does not exist in the pixel group; and
- when at least one of the vertical and horizontal pixel value change amounts is larger than the respective critical values, determining that an edge exists in the pixel group,
- wherein the interpolating according to edge directivity comprises:
- comparing the horizontal pixel value change amount with the vertical pixel value change amount;
- determining that edge directivity is vertical when the horizontal pixel value change amount is larger, that edge directivity is horizontal when the vertical pixel value change amount is larger, or that edge directivity is both horizontal and vertical when the horizontal pixel value change amount is identical to the vertical pixel value change amount;
- interpolating the color value of the center pixel using pixels in a column containing the center pixel when edge directivity is vertical;
- interpolating the color value of the center pixel using pixels in a row containing the center pixel when edge directivity is horizontal; and
- interpolating the color value of the center pixel using pixels in both the row and column containing the center pixel when edge directivity is vertical and horizontal,
- wherein when edge directivity is vertical, the method further comprising:
- comparing a first pixel value change amount between the center pixel and at least one pixel belonging to a column adjacent to the center pixel on the left side with a second pixel value change amount between the center pixel and at least one pixel belonging to a column adjacent to the center pixel on the right side, after the interpolating according to edge directivity;
- additionally interpolating the interpolated color value of the center pixel using pixels belonging to the column adjacent to the center pixel on the right side when a value obtained by subtracting the second pixel value change amount from the first pixel value change amount is larger than a predetermined critical value;
- additionally interpolating the interpolated color value of the center pixel using pixels belonging to the column adjacent to the center pixel on the left side when a value obtained by subtracting the second pixel value change amount from the first pixel value change amount is smaller than the predetermined critical value; and
- additionally interpolating the interpolated color value of the center pixel using pixels belonging to both columns adjacent to the center pixel on the right and left sides when a value obtained by subtracting the second pixel value change amount from the first pixel value change amount is identical to the predetermined critical value.

8. The method of claim 7, wherein when a color detected from the center pixel is not green, an interpolated green color value of the center pixel is used in obtaining the first and second pixel value change amounts.

9. The method of claim 7, wherein said interpolating using the low pass filter comprises:
- for a first color detected from the center pixel, determining an interpolated color value of the first color for the center pixel by obtaining a weighted average value of a color value of the first color of the center pixel and color values of the first color of a plurality of other pixels, in the pixel group; and
- for second colors not detected from the center pixel, determining interpolated color values of the second colors for the center pixel by obtaining weighted average values, for respective the second colors, of color values of a plurality of other pixels, in the pixel group.

10. The method of claim 9, wherein when obtaining the weighted average value, a smaller weight is applied to a color value of a pixel positioned farther from the center pixel.

11. A color interpolation method, comprising:
- defining a pixel group of a matrix structure, having a center pixel to be color-interpolated, in an image passed through a color filter of Bayer pattern and detected by an image sensor;
- determining whether an edge of the image exists or not in the pixel group;
- when an edge does not exist in the pixel group, interpolating a color value of the center pixel using a low pass filter; and
- when an edge exists in the pixel group, interpolating a color value of the center pixel according to edge directivity of the edge,
- wherein said determining comprises:
- calculating vertical and horizontal pixel value change amounts by using Gradient and Laplacian techniques, wherein the vertical pixel value change amount is a change amount of pixel values of pixels arranged in a vertical direction in the pixel group and wherein the horizontal pixel value change amount is a change amount of pixel values of pixels arranged in a horizontal direction in the pixel group;

comparing the horizontal and vertical pixel value change amounts with respective critical values corresponding to the horizontal and vertical directions, respectively;

when the vertical and horizontal pixel value change amounts are smaller than the respective critical values, determining that an edge does not exist in the pixel group; and when at least one of the vertical and horizontal pixel value change amounts is larger than the respective critical values, determining that an edge exists in the pixel group, wherein the interpolating according to edge directivity comprises:

comparing the horizontal pixel value change amount with the vertical pixel value change amount;

determining that edge directivity is vertical when the horizontal pixel value change amount is larger, that edge directivity is horizontal when the vertical pixel value change amount is larger, or that edge directivity is both horizontal and vertical when the horizontal pixel value change amount is identical to the vertical pixel value change amount;

interpolating the color value of the center pixel using pixels in a column containing the center pixel when edge directivity is vertical;

interpolating the color value of the center pixel using pixels in a row containing the center pixel when edge directivity is horizontal; and interpolating the color value of the center pixel using pixels in both the row and column containing the center pixel when edge directivity is vertical and horizontal, wherein when edge directivity is horizontal, the method further comprising:

comparing a third pixel value change amount between the center pixel and at least one pixel belonging to a row adjacent to the center pixel on the upper side with a fourth pixel value change amount between the center pixel and at least one pixel belonging to a row adjacent to the center pixel on the lower side, after the interpolating according to edge directivity;

additionally interpolating the interpolated color value of the center pixel using pixels belonging to the row adjacent to the center pixel on the lower side when a value obtained by subtracting the fourth pixel value change amount from the third pixel value change amount is larger than a predetermined critical value;

additionally interpolating the interpolated color value of the center pixel using pixels belonging to the row adjacent to the center pixel on the upper side when a value obtained by subtracting the fourth pixel value change amount from the third pixel value change amount is smaller than the predetermined critical value; and additionally interpolating the interpolated color value of the center pixel using pixels belonging to both the row adjacent to and upper the center pixel and the row adjacent to and lower the center pixel when a value obtained by subtracting the fourth pixel value change amount from the third pixel value change amount is identical to the predetermined critical value.

12. The method of claim 11, wherein when a color detected from the center pixel is not green, an interpolated green color value of the center pixel is used in obtaining the third and fourth pixel value change amounts.

13. The method of claim 11, wherein said interpolating using the low pass filter comprises:

for a first color detected from the center pixel, determining an interpolated color value of the first color for the center pixel by obtaining a weighted average value of a color value of the first color of the center pixel and color values of the first color of a plurality of other pixels, in the pixel group; and for second colors not detected from the center pixel, determining interpolated color values of the second colors for the center pixel by obtaining weighted average values, for respective the second colors, of color values of a plurality of other pixels, in the pixel group.

14. The method of claim 13, wherein when obtaining the weighted average value, a smaller weight is applied to a color value of a pixel positioned farther from the center pixel.

15. A color interpolation method, comprising:

defining a pixel group of a matrix structure, having a center pixel to be color-interpolated, in an image passed through a color filter of Bayer pattern and detected by an image sensor;

determining whether an edge of the image exists or not in the pixel group;

when an edge does not exist in the pixel group, interpolating a color value of the center pixel using a low pass filter; and when an edge exists in the pixel group, interpolating a color value of the center pixel according to edge directivity of the edge, wherein said determining comprises:

calculating vertical and horizontal pixel value change amounts by using Gradient and Laplacian techniques, wherein the vertical pixel value change amount is a change amount of pixel values of pixels arranged in a vertical direction in the pixel group and wherein the horizontal pixel value change amount is a change amount of pixel values of pixels arranged in a horizontal direction in the pixel group;

comparing the horizontal and vertical pixel value change amounts with respective critical values corresponding to the horizontal and vertical directions, respectively;

when the vertical and horizontal pixel value change amounts are smaller than the respective critical values, determining that an edge does not exist in the pixel group; and when at least one of the vertical and horizontal pixel value change amounts is larger than the respective critical values, determining that an edge exists in the pixel group, wherein the interpolating according to edge directivity comprises:

comparing the horizontal pixel value change amount with the vertical pixel value change amount;

determining that edge directivity is vertical when the horizontal pixel value change amount is larger, that edge directivity is horizontal when the vertical pixel value change amount is larger, or that edge directivity is both horizontal and vertical when the horizontal pixel value change amount is identical to the vertical pixel value change amount;

interpolating the color value of the center pixel using pixels in a column containing the center pixel when edge directivity is vertical;

interpolating the color value of the center pixel using pixels in a row containing the center pixel when edge directivity is horizontal; and interpolating the color value of the center pixel using pixels in both the row and column containing the center pixel when edge directivity is vertical and horizontal, wherein when edge directivity is vertical, the method further comprising:

calculating, by the following Equation 6, a first pixel value change amount between the center pixel and at least one pixel belonging to a column adjacent to the center pixel on the left side, and a second pixel value change amount between the center pixel and at least one pixel belonging to a column adjacent to the center pixel on the right side, after said interpolating according to edge directivity:

Equation 6 for first and second type pixel groups:

$$\Delta s\_h1 = |P33-P22|+|P33-P42|$$

$$\Delta s\_h2 = |P33-P24|+|P33-P44|;\ \text{and}$$

for third and fourth type pixel groups:

$$\Delta s\_h1 = |G33\_inter-P32|$$

$$\Delta s\_h2 = |G33\_inter-P34|,$$

where the first type pixel group is the pixel group in which a color detected from the center pixel in the pixel group is green and a pixel from which red is detected is disposed in the row containing the center pixel;

the second type pixel group is the pixel group in which a color detected form the center pixel in the pixel group is green and a pixel from which blue is detected is disposed in the row containing the center pixel;

the third type pixel group is the pixel group in which a color detected from the center pixel of the pixel group is red; and the fourth type pixel group is the pixel group in which a color detected from the center pixel of the pixel group is blue, and where Pmn is a pixel value of a pixel of $m^{th}$ row and $n^{th}$ column, G33_inter is an interpolated green color value of the center pixel, Δs_h1 is the first pixel value change amount, and Δs_h2 is the second pixel value change amount;

additionally interpolating the interpolated color value of the center pixel by the following Equation 7 when a value of Δs_h1-Δs_h2 is larger than a predetermined critical value;

additionally interpolating the interpolated color value of the center pixel by the following Equation 8 when a value of Δs_h1-Δs_h2 is smaller than the predetermined critical value; and additionally interpolating the interpolated color value of the center pixel by the following Equation 9 when a value of Δs_h1-Δs_h2 is identical to the predetermined critical value, Equation 7 for the first type pixel group:

$$R33\_inter = \left(\frac{R34+R14}{2} + \frac{R34+R54}{2}\right)/2 + ((G33-G24)+(G33-G44))/2;$$

for the second type pixel group:

$$B33\_inter = \left(\frac{B34+B14}{2} + \frac{B34+B54}{2}\right)/2 + ((G33-G24)+(G33-G44))/2;$$

For the third type pixel group:

$$B33\_inter = (B24+B44)/2 + \left(\left(G33\_inter-\frac{G14+G34}{2}\right)+\left(G33\_inter-\frac{G34+G54}{2}\right)\right)/2;$$

and for the fourth type pixel group:

$$R33\_inter = (R24+R44)/2 + \left(\left(G33\_inter-\frac{G14+G34}{2}\right)+\left(G33\_inter-\frac{G34+G54}{2}\right)\right)/2,$$

where Gmn is a green color value of a pixel of $m^{th}$ row and $n^{th}$ column, Rmn is a red color value of a pixel of $m^{th}$ row and $n^{th}$ column, Bmn is a blue color value of a pixel of $m^{th}$ row and $n^{th}$ column, R33_inter is an interpolated red color value of the center pixel, and B33_inter is an interpolated blue color value of the center pixel;

Equation 8 for the first type pixel group:

$$R33\_inter = \left(\frac{R12+R32}{2} + \frac{R32+R52}{2}\right)/2 + ((G33-G22)+(G33-G42))/2;$$

for the second type pixel group:

$$B33\_inter = \left(\frac{B12+B32}{2} + \frac{B32+B52}{2}\right)/2 + ((G33-G22)+(G33-G42))/2;$$

for the third type pixel group:

$$B33\_inter = (B22+B42)/2 + \left(\left(G33\_inter-\frac{G12+G32}{2}\right)+\left(G33\_inter-\frac{G32+G52}{2}\right)\right)/2;$$

and for the fourth type pixel group:

$$R33\_inter = (R24+R42)/2 + \left(\left(G33\_inter-\frac{G12+G32}{2}\right)+\left(G33\_inter-\frac{G32+G52}{2}\right)\right)/2,\ \text{and}$$

Equation 9
for the first type pixel group:

$$R33\_inter = \left(\frac{R34+R14}{2} + \frac{R34+R54}{2} + \frac{R12+R32}{2} + \frac{R32+R52}{2}\right)/4 +$$
$$((G33-G24)+(G33-G44)+(G33-G22)+(G33-G42))/4;$$

for the second type pixel group:

$$B33\_inter = \left(\frac{B34+B14}{2} + \frac{B34+B54}{2} + \frac{B12+B32}{2} + \frac{B32+B52}{2}\right)/4 +$$
$$((G33-G24)+(G33-G44))+(G33-G22)+(G33-G42))/4;$$

for the third type pixel group:

$$B33\_inter = (B22+B24+B44)/4 +$$
$$\left(\left(G33\_inter - \frac{G14+G34}{2}\right) + \left(G33\_inter - \frac{G34+G54}{2}\right) + \left(G33\_inter - \frac{G12+G32}{2}\right) + \left(G33\_inter - \frac{G32+G52}{2}\right)\right)/4;$$

For
and
the fourth type pixel group:

$$R33\_inter = (R22+R24+R44)/4 +$$
$$\left(\left(G33\_inter - \frac{G14+G34}{2}\right) + \left(G33\_inter - \frac{G34+G54}{2}\right) + \left(G33\_inter - \frac{G12+G32}{2}\right) + \left(G33\_inter - \frac{G32+G52}{2}\right)\right)/4.$$

16. The method of claim 15, wherein said interpolating using the low pass filter comprises:
for a first color detected from the center pixel, determining an interpolated color value of the first color for the center pixel by obtaining a weighted average value of a color value of the first color of the center pixel and color values of the first color of a plurality of other pixels, in the pixel group; and
for second colors not detected from the center pixel, determining interpolated color values of the second colors for the center pixel by obtaining weighted average values, for respective the second colors, of color values of a plurality of other pixels, in the pixel group.

17. The method of claim 16, wherein when obtaining the weighted average value, a smaller weight is applied to a color value of a pixel positioned farther from the center pixel.

18. A color interpolation method, comprising:
defining a pixel group of a matrix structure, having a center pixel to be color-interpolated, in an image passed through a color filter of Bayer pattern and detected by an image sensor;
determining whether an edge of the image exists or not in the pixel group;
when an edge does not exist in the pixel group, interpolating a color value of the center pixel using a low pass filter; and
when an edge exists in the pixel group, interpolating a color value of the center pixel according to edge directivity of the edge,
wherein said determining comprises:
calculating vertical and horizontal pixel value change amounts by using Gradient and Laplacian techniques, wherein the vertical pixel value change amount is a change amount of pixel values of pixels arranged in a vertical direction in the pixel group and wherein the horizontal pixel value change amount is a change amount of pixel values of pixels arranged in a horizontal direction in the pixel group;
comparing the horizontal and vertical pixel value change amounts with respective critical values corresponding to the horizontal and vertical directions, respectively;
when the vertical and horizontal pixel value change amounts are smaller than the respective critical values, determining that an edge does not exist in the pixel group; and
when at least one of the vertical and horizontal pixel value change amounts is larger than the respective critical values, determining that an edge exists in the pixel group,
wherein the interpolating according to edge directivity comprises:
comparing the horizontal pixel value change amount with the vertical pixel value change amount;
determining that edge directivity is vertical when the horizontal pixel value change amount is larger, that edge directivity is horizontal when the vertical pixel value change amount is larger, or that edge directivity is both horizontal and vertical when the horizontal pixel value change amount is identical to the vertical pixel value change amount;
interpolating the color value of the center pixel using pixels in a column containing the center pixel when edge directivity is vertical;
interpolating the color value of the center pixel using pixels in a row containing the center pixel when edge directivity is horizontal; and
interpolating the color value of the center pixel using pixels in both the row and column containing the center pixel when edge directivity is vertical and horizontal,
wherein when edge directivity is horizontal, the method further comprising:
calculating, by the following Equation 10, a third change amount between the center pixel and at least one pixel belonging to a row adjacent to the center pixel on the upper side, and a fourth change amount between the center pixel and at least one pixel belonging to a row adjacent to the center pixel on the lower side, after said interpolating according to edge directivity:
Equation 10
for first and second type pixel groups:

$$\Delta s\_v1 = |P33-P22|+|P33-P24|$$

$$\Delta s\_v2 = |P33-P42|+|P33-P44|; \text{ and}$$

for third and fourth type pixel groups:

$$\Delta s\_v1 = |G33\_inter-P23|$$

$$\Delta s\_v2 = |G33\_inter-P43|,$$

where the first type pixel group is the pixel group in which a color detected from the center pixel in the pixel group is green and a pixel from which red is detected is disposed in the row containing the center pixel;

the second type pixel group is the pixel group in which a color detected form the center pixel in the pixel group is green and a pixel from which blue is detected is disposed in the row containing the center pixel;

the third type pixel group is the pixel group in which a color detected from the center pixel of the pixel group is red; and the fourth type pixel group is the pixel group in which a color detected from the center pixel of the pixel group is blue, and where Pmn is a pixel value of a pixel of $m^{th}$ row and $n^{th}$ column, G33_inter is an interpolated green color value of the center pixel, $\Delta s\_v1$ is the third pixel value change amount, and $\Delta s\_v2$ is the fourth pixel value change amount;

additionally interpolating the interpolated color value of the center pixel by the following Equation 11 when the value of $\Delta s\_v1 - \Delta s\_v2$ in the Equation 10 is larger than a predetermined critical value;

additionally interpolating the interpolated color value of the center pixel by the following Equation 12 when the value of $\Delta s\_v1 - \Delta s\_v2$ in the Equation 10 is smaller than the predetermined critical value; and additionally interpolating the interpolated color value of the center pixel by the following Equation 13 when the value of $\Delta s\_v1 - \Delta s\_v2$ in the Equation 10 is identical to the predetermined critical value, Equation 11
for the first type pixel group:

$$B33\_inter = \left(\frac{B43+B41}{2} + \frac{B43+B45}{2}\right)/2 + ((G33-G42)+(G33-G44))/2;$$

for the second type pixel group:

$$R33\_inter = \left(\frac{R43+R41}{2} + \frac{R43+R45}{2}\right)/2 + ((G33-G42)+(G33-G44))/2;$$

for the third type pixel group:

$$B33\_inter = (B42+B44)/2 + \left(\left(G33\_inter - \frac{G41+G43}{2}\right) + \left(G33\_inter - \frac{G43+G45}{2}\right)\right)/2;$$

and
for the fourth type pixel group:

$$R33\_inter = (R42+R44)/2 + \left(\left(G33\_inter - \frac{G41+G43}{2}\right) + \left(G33\_inter - \frac{G43+G45}{2}\right)\right)/2,$$

where Gmn is a green color value of a pixel of $m^{th}$ row and $n^{th}$ column, Rmn is a red color value of a pixel of $m^{th}$ row and $n^{th}$ column, Bmn is a blue color value of a pixel of $m^{th}$ row and $n^{th}$ column, R33_inter is an interpolated red color value of the center pixel, and B33_inter is an interpolated blue color value of the center pixel;

Equation 12
for the first type pixel group:

$$B33\_inter = \left(\frac{B23+B21}{2} + \frac{B23+B25}{2}\right)/2 + ((G33-G22)+(G33-G24))/2;$$

for the second type pixel group:

$$R33\_inter = \left(\frac{R23+R21}{2} + \frac{R23+R25}{2}\right)/2 + ((G33-G22)+(G33-G24))/2;$$

for the third type pixel group:

$$B33\_inter = (B22+B24)/2 + \left(\left(G33\_inter - \frac{G12+G23}{2}\right) + \left(G33\_inter - \frac{G23+G25}{2}\right)\right)/2;$$

and
for the fourth type pixel group:

$$R33\_inter = (R22+R24)/2 + \left(\left(G33\_inter - \frac{G12+G23}{2}\right) + \left(G33\_inter - \frac{G23+G25}{2}\right)\right)/2,$$

and
Equation 13
for the first type pixel group:

$$B33\_inter = \left(\frac{B43+B41}{2} + \frac{B43+B45}{2} + \frac{B23+B21}{2} + \frac{R23+R25}{2}\right)/4 + ((G33-G42)+(G33-G44)+(G33-G22)+(G33-G24))/4;$$

for the second type pixel group:

$$R33\_inter = \left(\frac{R43+R41}{2} + \frac{R43+R45}{2} + \frac{R23+R21}{2} + \frac{R23+R25}{2}\right)/4 + ((G33-G42)+(G33-G44)+(G33-G22)+(G33-G24))/4;$$

for the third type pixel group:

$$B33\_inter = (B22+B24+B42+B44)/4 + \left(\left(G33\_inter - \frac{G21+G23}{2}\right) + \left(G33\_inter - \frac{G23+G25}{2}\right) + \right.$$

-continued $$\left(G33\_inter - \frac{G41 + G43}{2}\right) + \left(G33\_inter - \frac{G43 + G45}{2}\right)\right)\Big/ 4;$$

and
for the fourth type pixel group:

$$R33\_inter = (R22 + R24 + R42 + R44)/4 +$$
$$\left(\left(G33\_inter - \frac{G21 + G23}{2}\right) + \left(G33\_inter - \frac{G23 + G25}{2}\right) + \left(G33\_inter - \frac{G41 + G43}{2}\right) + \left(G33\_inter - \frac{G43 + G45}{2}\right)\right)\Big/ 4.$$

19. The method of claim 18, wherein said interpolating using the low pass filter comprises:
    for a first color detected from the center pixel, determining an interpolated color value of the first color for the center pixel by obtaining a weighted average value of a color value of the first color of the center pixel and color values of the first color of a plurality of other pixels, in the pixel group; and
    for second colors not detected from the center pixel, determining interpolated color values of the second colors for the center pixel by obtaining weighted average values, for respective the second colors, of color values of a plurality of other pixels, in the pixel group.

20. The method of claim 19, wherein when obtaining the weighted average value, a smaller weight is applied to a color value of a pixel positioned farther from the center pixel.

* * * * *